United States Patent
Koul et al.

(10) Patent No.: US 12,417,469 B1
(45) Date of Patent: Sep. 16, 2025

(54) IDENTIFYING USER PROFILES FOR CAMPAIGN MODIFICATION

(71) Applicant: CSC HOLDINGS, LLC, Bethpage, NY (US)

(72) Inventors: Aishwarya Koul, Jersey City, NJ (US); Peter Ronga, Haverstraw, NY (US); Kevin O'Reilly, Lexington, KY (US); Rachel Owens, Brooklyn, NY (US); Lara Jalwan, Brooklyn, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 18/163,454

(22) Filed: Feb. 2, 2023

(51) Int. Cl.
*G06Q 30/0251* (2023.01)
*G06Q 30/0204* (2023.01)
*G06Q 30/0242* (2023.01)

(52) U.S. Cl.
CPC ..... *G06Q 30/0244* (2013.01); *G06Q 30/0205* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 10,460,353 B2 * | 10/2019 | Hsu | G06Q 30/0269 |
| 2008/0052157 A1 * | 2/2008 | Kadambi | G06Q 30/0275 |
| | | | 705/14.66 |
| 2014/0280237 A1 * | 9/2014 | Salkola | G06Q 50/01 |
| | | | 707/749 |
| 2016/0345076 A1 * | 11/2016 | Makhlouf | G06Q 30/02 |
| 2017/0034591 A1 * | 2/2017 | Ray | G06Q 30/0275 |
| 2019/0278378 A1 * | 9/2019 | Yan | G06Q 30/0254 |

* cited by examiner

*Primary Examiner* — Vincent M Cao
(74) *Attorney, Agent, or Firm* — Lowenstein Sandler LLP

(57) ABSTRACT

A first user profile that indicates a first user type may be identified based on a request to generate a content campaign for a first communication medium that targets the first user type. A second user profile for a content provider of a second communication medium may be identified based on the generated content campaign and an amount of attributes of the first user profile mapped to attributes of a second user profile exceeding a threshold. The generated content campaign may be modified to target a second user type indicated by the second user profile that matches the first user type. A content item may be sent to a user device associated with the first user type and a user device associated with the second user type based on the modified content campaign.

20 Claims, 10 Drawing Sheets

IDENTIFYING USER PROFILES FOR CAMPAIGN MODIFICATION

BACKGROUND

The way television and/or content is delivered to users varies. Television and/or content delivery methods include broadcast/linear television, cable television, and over-the-top (OTT) streaming. Television and/or content is accessed, watched, and/or consumed on different devices (e.g, cathode-ray televisions, computers, set-top boxes, display devices, mobile devices, etc.). In other words, television is "fragmented" and there is no consolidated way to buy a completed television, advertisement, and/or content campaign (e.g., campaigns for cable television are different from campaigns from OTT media, etc.). Advertisers that incur the cost of cable television advertising are unable to reach large portions of existing and/or potential audiences (e.g., audiences that do not have cable subscriptions, etc.). When advertisers that incur the cost of cable television content campaigns also create OTT content campaigns they incur additional costs and loss of audience due to a lack of integration between media platforms.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for identifying user profiles for campaign modification. A computing device may identify a first plurality of user profiles based on timing information that indicates a plurality of access times for content provided by a content provider of a first communication medium. A first user profile of the first plurality of user profiles that indicates the first user type may be identified based on a request to generate a content campaign for the content provider of the first communication medium that targets a first user type. A second user profile of a second plurality of user profiles for a content provider of a second communication medium may be identified based on the generated content campaign for the content provider of the first communication medium and an amount of attributes of the first user profile mapped to attributes of a second user profile exceeding a threshold. The generated content campaign may be modified to target a second user type indicated by the second user profile that matches the first user type. A content item may be sent to a user device associated with the first user type and a user device associated with the second user type based on the modified content campaign.

Figure 1:
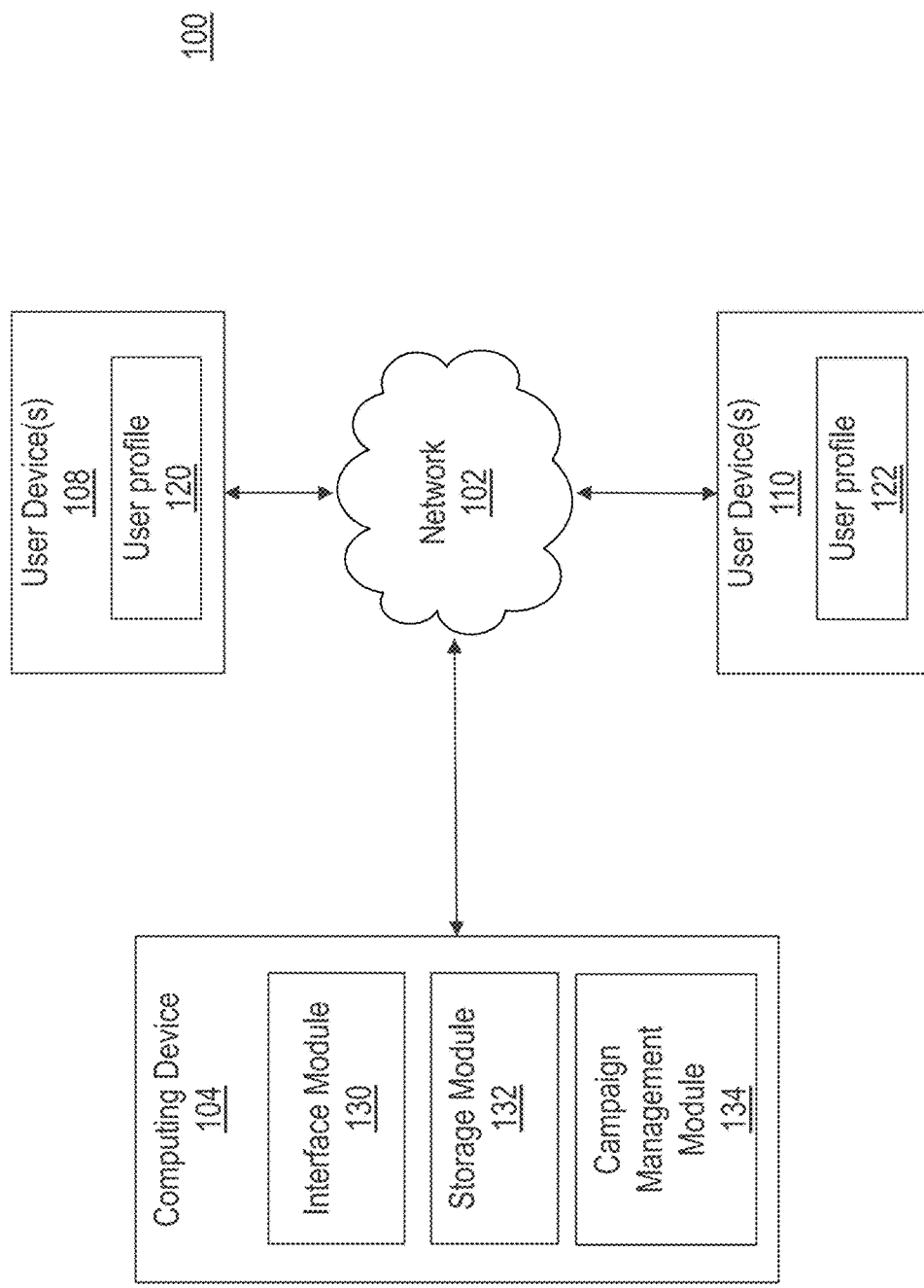
FIG. 1 shows a block diagram of a system identifying user profiles for campaign modification, according to some aspects of this disclosure.

FIG. 1 shows a block diagram of an example system 100 for identifying user profiles for campaign modification. According to some aspects of this disclosure, system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein. According to some aspects of this disclosure, aspects of system 100 may include and/or operate with software, hardware, combinations thereof, and/or the like.

According to some aspects of this disclosure, system 100 may include a network 102. According to some aspects of this disclosure, network 102 may include a packet-switched network (e.g., internet protocol-based network), a non-packet-switched network (e.g., quadrature amplitude modulation-based network), and/or the like. According to some aspects of this disclosure, network 102 may include network adapters, switches, routers, modems, and the like connected through wireless links (e.g., radiofrequency, satellite) and/or physical links (e.g., fiber optic cable, coaxial cable, Ethernet cable, or a combination thereof). According to some aspects of this disclosure, network 102 may include public networks, private networks, wide area networks (e.g., Internet), local area networks, and/or the like. According to some aspects of this disclosure, network may include a content access network, content distribution network, and/or the like. According to some aspects of this disclosure, network 102 may provide and/or support communication from telephone, cellular, modem, and/or other electronic devices to and throughout system 100. For example, system 100 may include at least a computing device 104, a storage device 106, a user device(s) 108, and a user device(s) 110 each in communication and/or connected via network 102.

According to some aspects of this disclosure, user device(s) 108 may include, but are not limited to, computing devices, set-top boxes, media terminals, display devices, content access and/or playback devices, and/or the like. According to some aspects of this disclosure, user device(s) 108 may be associated with a location(s) including, but not limited to, a single-family house, a condo, an apartment, an office, and/or the like where devices will be used to consume content provided via a particular communication medium (e.g., cable television, linear television, etc.) on a permanent basis (e.g., a deterministic location, etc.). According to some aspects of this disclosure, user device(s) 108 may be associated with (e.g., owned by, operated by, accessible by, etc.) a user (or group of users) that may be indicated by a user profile 120 (e.g., an account, device identifier, a user identifier, service subscription information, etc.).

According to some aspects of this disclosure, user profile 120 may store, be, and/or indicate information that can be used by computing device 104 to generate a content campaign (e.g., an advertisement campaign, a content item distribution plan, etc.). According to some aspects of this disclosure, user profile 120 may indicate a location (e.g., a house/home, a residence, a state(s), a county(s), a city, a neighborhood(s), combinations thereof, etc.), According to some aspects of this disclosure, user profile 120 may store, be, and/or indicate information that can be used by computing device 104 to perform operations including, but not limited to, generating cost information and/or a budget for deploying a content campaign, identifying/determining a goal for a content campaign, identifying/determining a frequency range indicating the number of times that a content campaign should be shown to a user and/or group of users, identifying/determining a date range indicating when content (e.g, advertisements, media, etc.) should be shown, identifying/determining an intended audience (e.g., types of users expected to watch particular content at particular times, etc.), and/or the like.

According to some aspects of this disclosure, user device(s) 110 may include, but are not limited to, computing devices, mobile devices, smart devices, OTT content/media access and/or playback devices, and/or the like. According to some aspects of this disclosure, user device(s) 110 may be used to consume content provided via a particular communication medium (e.g., OTT media/content, etc.). According to some aspects of this disclosure, user device(s) 110 may be associated with (e.g., owned by, operated by, accessible by, etc.) a user (or group of users) that may be indicated by a user profile 122 (e.g., an account, an Internet protocol (IP) address, digital identification information, etc.).

According to some aspects of this disclosure, user profile 122 may store, be, and/or indicate information that can be used by computing device 104 to modify a content campaign (e.g., an advertisement campaign, a content item distribution plan, etc.) generated to target user/devices associated with a different communication medium (e.g., a user indicated by user profile 120, etc.). According to some aspects of this disclosure, user profile 122 may store, be, and/or indicate information that can be used by computing device 104 to perform operations including, but not limited to, generating cost information and/or a budget for deploying a modified content campaign, identifying/determining a goal for a modified content campaign, identifying/determining a frequency range indicating the number of times that a modified content campaign should be shown to a user and/or group of users, identifying/determining a date range indicating when content (e.g, advertisements, media, etc.) should be shown, identifying/determining an intended audience (e.g., types of users expected to watch particular content at particular times, etc.), and/or the like.

According to some aspects of this disclosure, computing device 104 may include, but is not limited to, a computing device, a content/media tracking device, a server, a cloud-based device, a content/media management device, and/or the like. According to some aspects of this disclosure, although shown as a single device for simplicity, computing device 104 may be, may include, may communicate with, and/or may share operations with a system and/or one or more computing devices.

According to some aspects of this disclosure, computing device 104 may include an interface module 130 for providing an interface to a user to interact with computing device 104 and/or any other device component of system 100. According to some aspects of this disclosure, interface module 130 may be, include, and/or generate any interface (e.g., a user interface, an application page, a content campaign generation tool, etc.) for presenting and/or receiving information to/from the user. According to some aspects of this disclosure, interface module 130 may be, include, and/or generate a web browser (e.g., Internet Explorer®, Mozilla Firefox®, Google Chrome®, Safari®, or the like). According to some aspects of this disclosure, interface module 130 may be, include, and/or generate other software, hardware, and/or interfaces to provide communication between a user, computing device 104, and/or any device/component of system 100. According to some aspects of this disclosure, interface module 130 may request or query various files from a local source and/or a remote source, for example, one or more third-party devices to obtain deterministic data, a list of content/media interest categories, and/or the like.

According to some aspects of this disclosure, computing device 104 may include a storage module 132. According to some aspects of this disclosure, storage module 132 may store user data including, but not limited to, lists of interest categories, content/media item affinity information, indications of content/media consumption propensities associated with multiple users and/or user device across multiple and/or different content/media medium and/or platforms. According to some aspects of this disclosure, content/media consumption propensities may include, but is not limited to, indications of user(s) age, user(s) income, user(s) familial situation (e.g., a presence of children, etc.), user(s) education level, user(s) language preference. According to some aspects of this disclosure, multiple and/or different content/media mediums and/or platforms may include a cable television medium and/or service, an over-the-air broadcast television media platform and/or service, a cable television media platform and/or service, a mobile/desktop video media platform and/or service, a social video media platform and/or service, combinations thereof, and/or the like.

According to some aspects of this disclosure, storage module 132 may include cost, budget, and/or pricing information. According to some aspects of this disclosure, the cost, budget, and/or pricing information may include indications (e.g., current indications, historical indications, etc.) of cost, budget, and/or pricing information associated with content/media campaigns. According to some aspects of this disclosure, storage module 132 may store indications of viewing information (e.g., duration spent by a household viewing a network/channel, etc.) for multiple users across various communication and/or content/media mediums/platforms.

According to some aspects of this disclosure, computing device 104 may include a campaign management module 134. According to some aspects of this disclosure, campaign management module 134 may receive and/or access data/information from storage module 132 to generate and/or modify content campaigns. According to some aspects of this disclosure, campaign management module 134 may generate and/or output content campaigns intended to reach users and/or user devices associated with a particular communication and/or content/media medium (e.g., OTT) that cannot be addressed by a different communication and/or content/media medium (e.g., cable television, users/user devices at households that do not have a cable Subscription). For example, according to some aspects of this disclosure, campaign management module 134 may transform a traditional television plan into a multiscreen campaign using audience deterministic data, historical advertisement campaign information, and/or the like. According to some aspects of this disclosure, campaign management module 134 may identify a target audience for a content campaign and/or recommend cost, budget, and/or pricing information. According to some aspects, computing device 104 may use campaign management module 134 to generate and/or output a user interface that enables and/or facilitates expansion and/or modification of a content campaign, for example, in response to minimal interactions with the user interface.

According to some aspects of this disclosure, campaign management module 134 may include an analytical model, a machine-learning and/or predictive model, a mathematical model, and/or the like. According to some aspects of this disclosure, to facilitate identifying user profiles for campaign modification, the campaign management module 134 may be trained to determine correspondences between users/audience of a particular communication medium and/or content/media platform/service, for example, based on an index value that may be used for mapping content providers for a particular communication medium and/or content/media platform to interest categories, content/media item affinity information, indications of content/media consumption propensities, and/or the like and other algorithms, methods, techniques, and/or the like may be used to map content providers for a particular communication medium and/or content/media platform to interest categories, content/media item affinity information, indications of content/media consumption propensities, and/or the like. According to some aspects of this disclosure, campaign management module 134 may analyze the profile of users that have tuned in to selected television networks (e.g., via a first communication medium, etc.) and then identify users that have similar behavior within a predefined demographic and location (and/or associated with a second communication medium, etc.).

According to some aspects of this disclosure, FIG. 2A-E show example screens, pages, and/or the like of a user interface 200 (e.g., generated and/or displayed via interface module 130, etc.) for managing operations (e.g., content campaign generation and modification, etc.) of computing device 104 (e.g., campaign management module 134, etc.).

Figure 2A:
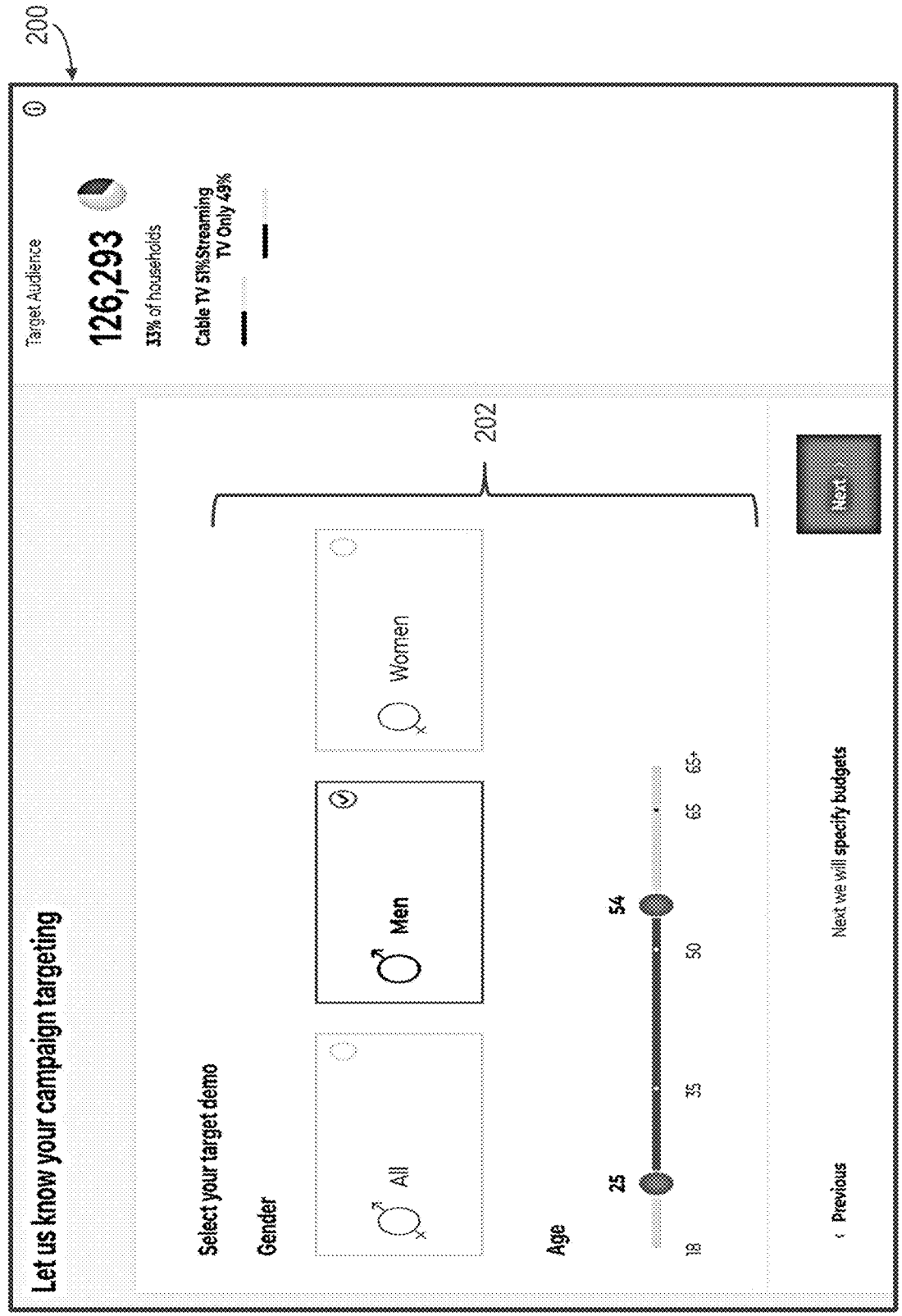
FIG. 2A-E show example screens, pages, and/or the like of a user interface for campaign modification, according to some aspects of this disclosure.

According to some aspects of this disclosure, FIG. 2A shows an example screen, page, and/or the like of user interface 200 that may be used and/or interacted with to generate a content campaign for a single communication medium (e.g., cable television, etc.). According to some aspects of this disclosure, user interface 200 may include interactive elements 202. According to some aspects of this disclosure, interaction with interactive elements 202 that detail criteria for and/or enables, and/or instructs, for example, campaign management module 134, to generate a content campaign. For example, interactive elements 202 may be interacted with to select a target demographic for a content campaign.

Figure 2B:
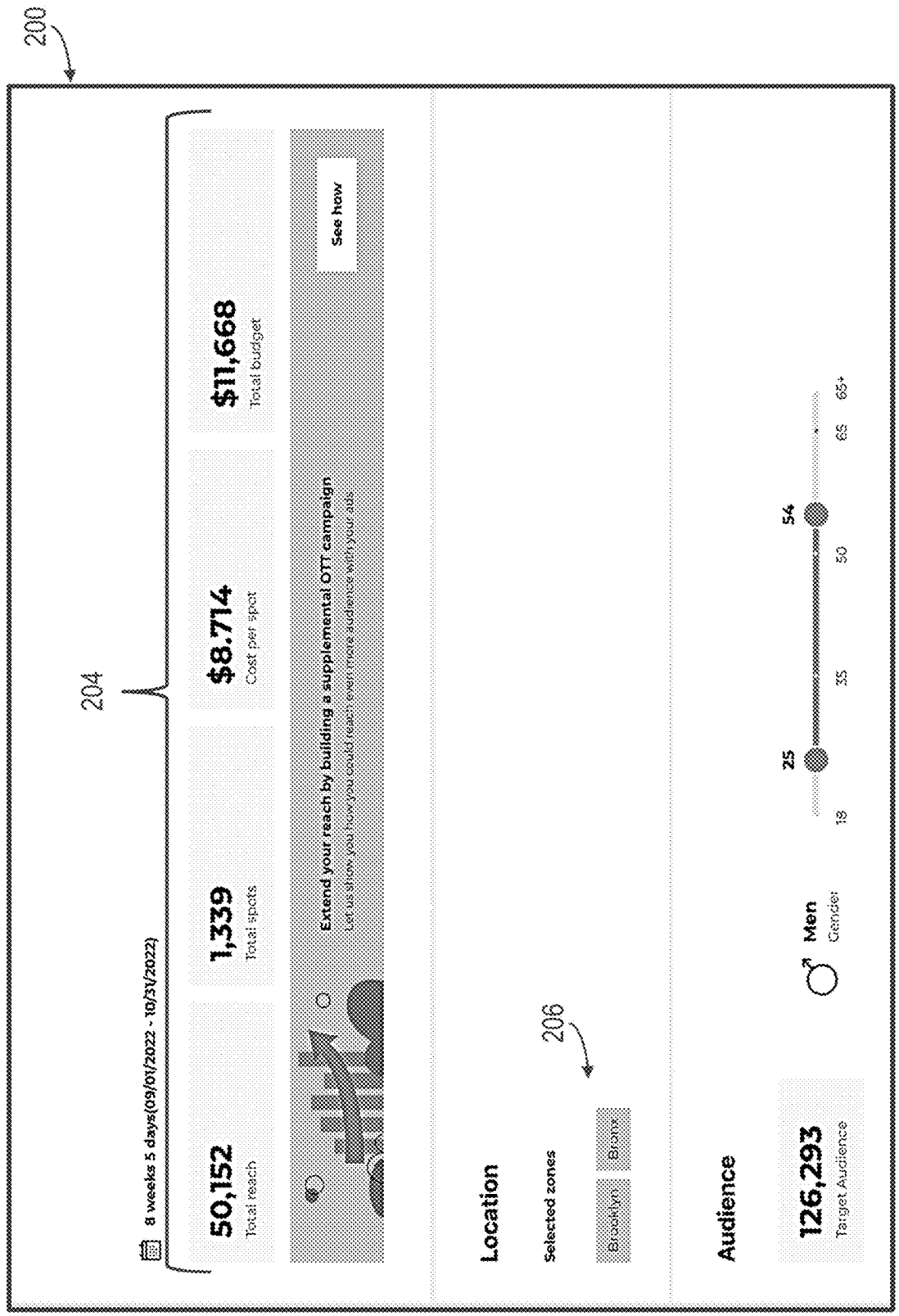

According to some aspects of this disclosure, FIG. 2B shows an example screen, page, and/or the like of user interface 200 that includes details 204 and 206 describing the content campaign generated in FIG. 2A. According to some aspects of this disclosure, details describing the content campaign may include an indication of information including, but not limited to, a total amount of target audience and/or interest groups that will/should receive content (e.g., advertisements, etc.) via the content campaign, a total amount of spots (e.g., timeslots allotted for content, etc.), a cost associated with each spot, a total budget for the content campaign, an indication of locations where the content campaign will run, and/or the like.

Figure 2C:
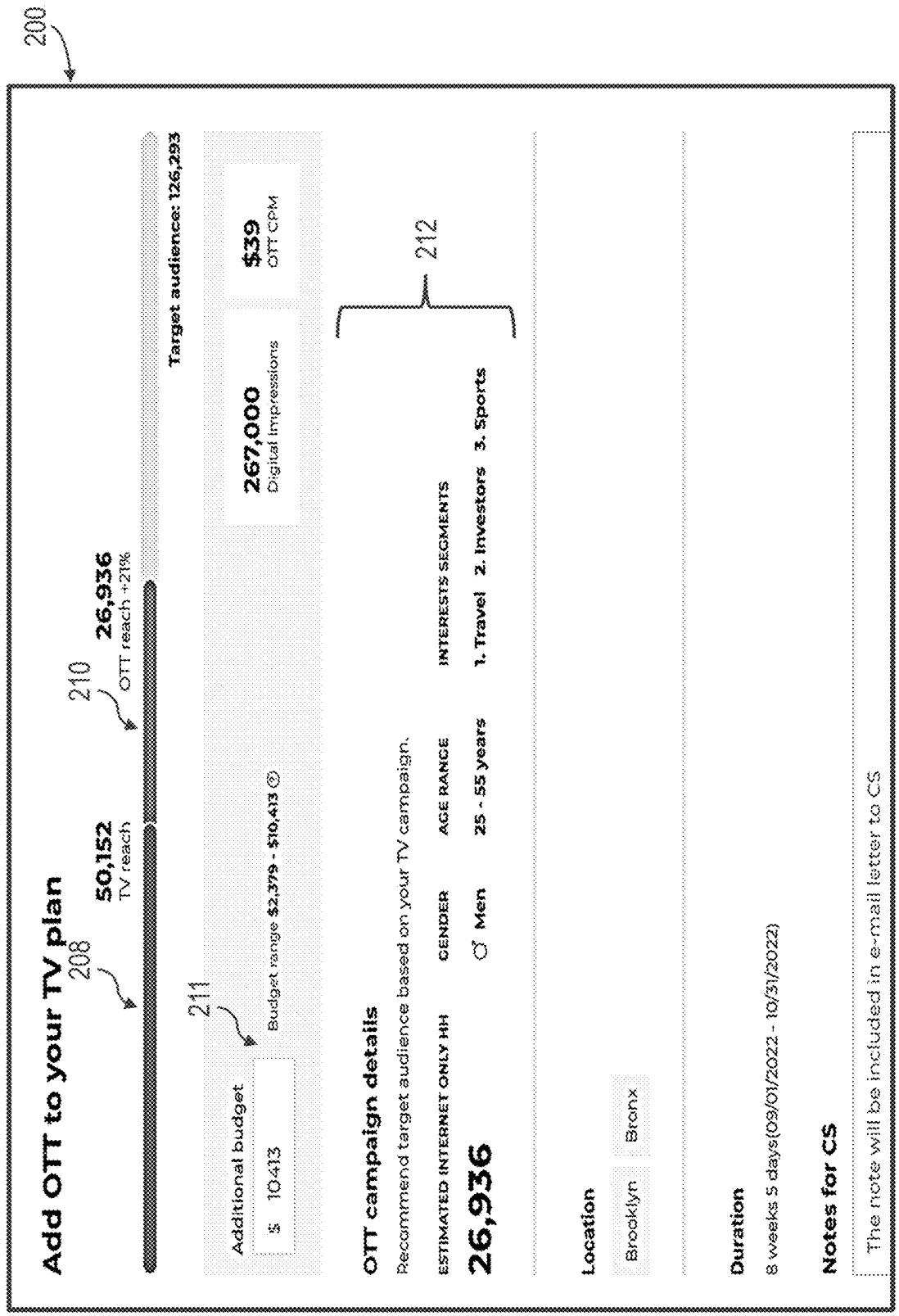

According to some aspects of this disclosure, FIG. 2C shows an example screen, page, and/or the like of user interface 200 that shows example recommendation information for modifying and/or extending the content campaign generated in FIG. 2A. As described herein, when a content campaign is generated to target an audience supported by a particular communication medium (e.g., cable television, etc.), according to some aspects of this disclosure, computing device 104 (e.g., campaign management module 134, etc.) may generate and/or recommend modification and/or extension of the content campaign, for example, to target an audience supported by a different communication medium (e.g., OTT television, etc.).

Figure 2D:
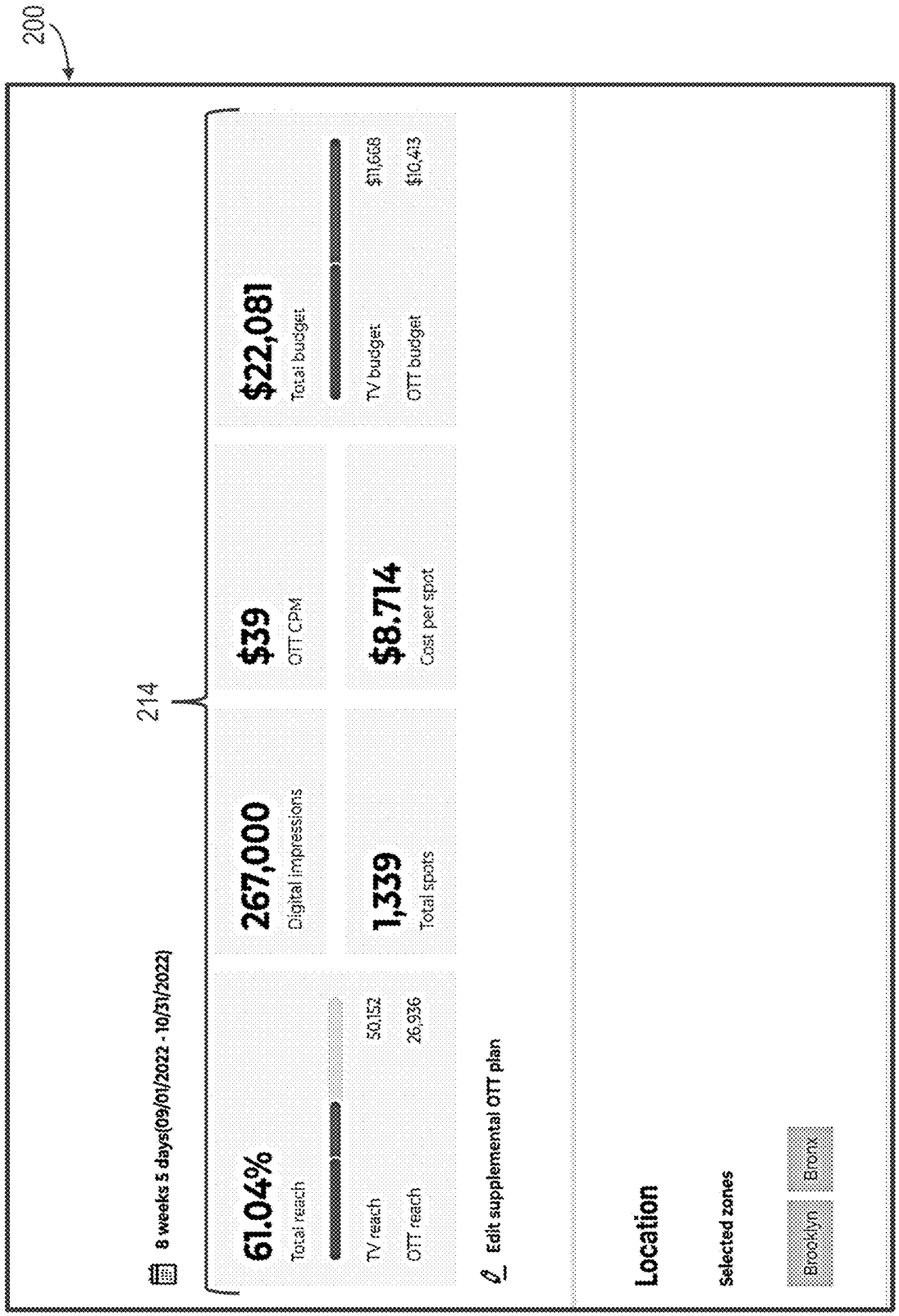

According to some aspects of this disclosure, FIG. 2D shows an example screen, page, and/or the like of user interface 200 that includes details describing the modified and/or extended content campaign generated in FIG. 2A. According to some aspects of this disclosure, details describing the modified and/or extended content campaign may include, but is not limited to, an indication 208 of a total amount of target an audience supported by a particular communication medium (e.g., cable television, etc.) that will/should receive content (e.g., advertisements, etc.) via the modified and/or extended content campaign, and an indication 210 of a total amount of target an audience supported by a different communication medium (e.g., OTT television, etc.) that will/should receive content (e.g., advertisements, etc.) via the modified and/or extended content campaign, an indication 211 of a total budget for the modified and/or extended content campaign, summary information 212 that provides details describing a recommended target audience for the modified and/or extended content campaign, an indication of locations where the modified and/or extended content campaign will run, and/or the like.

Figure 2E:
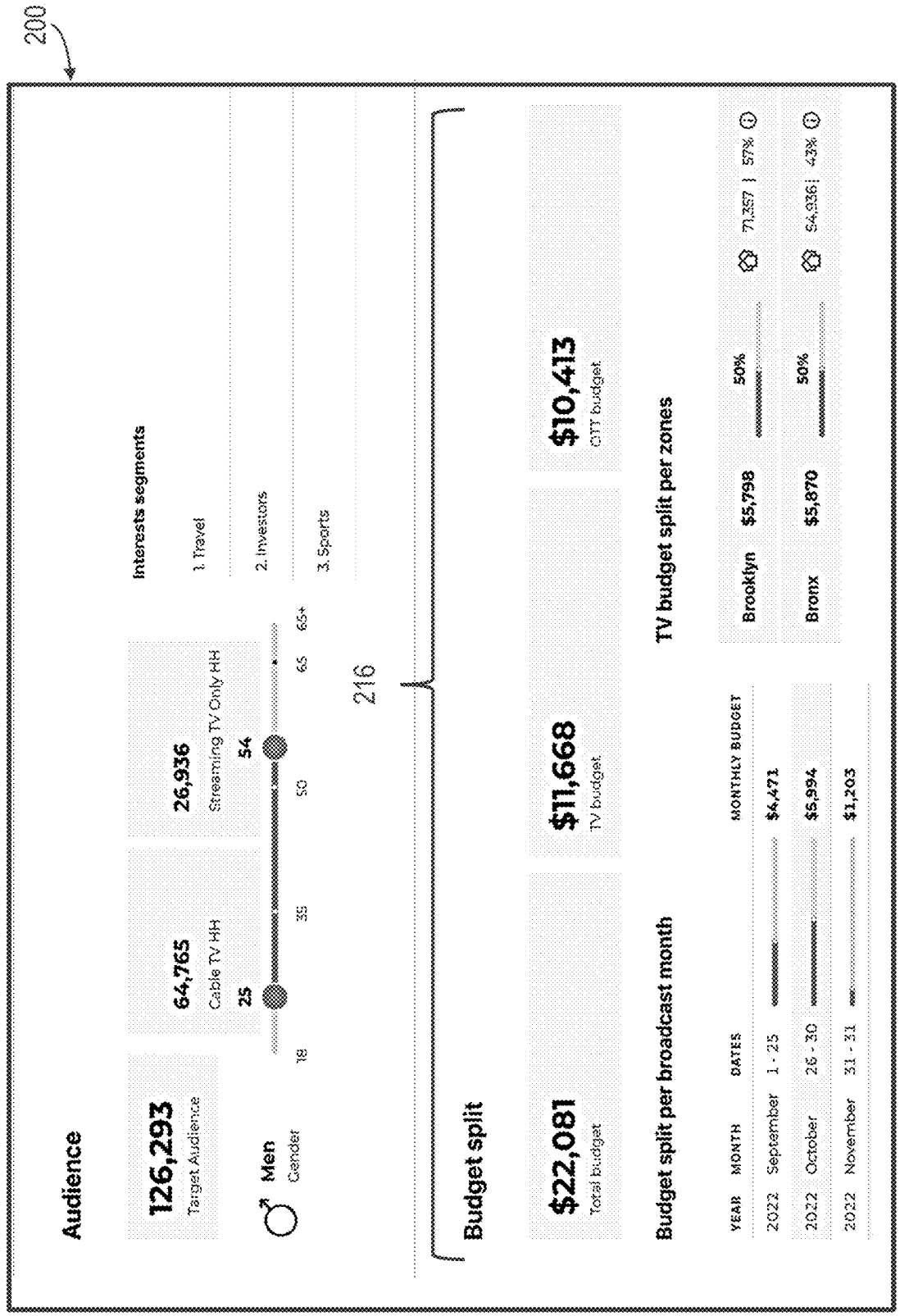

According to some aspects of this disclosure, FIG. 2E shows an example screen, page, and/or the like of user interface 200 that provides additional summary information 214 the modified and/or extended content campaign. According to some aspect, any information used to generate, modify, extend, and/or review a content campaign may be displayed and/or presented via user interface 200.

Returning to FIG. 1, according to some aspects of this disclosure, to generate and/or output a content campaign, campaign management module 134 may begin by mapping content providers for a particular communication medium and/or content/media platform to interest categories, content/media item affinity information, indications of content/media consumption propensities, and/or the like. According to some aspects of this disclosure, ALGORITHM 1 below shows an example algorithm for calculating an index value that may be used to mapping content providers for a particular communication medium and/or content/media platform to interest categories, content/media item affinity information, indications of content/media consumption propensities, and/or the like.

ALGORITHM 1

For each cable television network, to calculate an index for an interest category:
1. Identify the duration spent by a cable television subscribed household viewing television (e.g., any channel/network).
2. Identify the duration spent by a cable television subscribed household viewing a particular channel/network.
3. Divide the duration spent viewing the particular channel/network by the total duration of viewing television.
4. Multiply the result of Step 3 by 100 to calculate an index value.

As an example application of ALGORITHM 1, a calculated index value of 132 indicates that an interest group and/or audience is 1.32 times more likely to view a channel/network than the general population. According to some aspects of this disclosure, ALGORITHM 1 is an example of calculating an index value that may be used for mapping content providers for a particular communication medium and/or content/media platform to interest categories, content/media item affinity information, indications of content/media consumption propensities, and/or the like and other algorithms, methods, techniques, and/or the like may be used to map content providers for a particular communication medium and/or content/media platform to interest categories, content/media item affinity information, indications of content/media consumption propensities, and/or the like.

According to some aspects of this disclosure, once campaign management module 134 calculates and/or determines an index of each selected channel/network against the audience/interest categories, campaign management module 134 may identify and/or select the audience/interest categories that satisfy and/or exceed a threshold. According to some aspects of this disclosure, campaign management module 134 may use audience/interest categories that satisfy and/or exceed the threshold to generate a list of candidate audience/interest categories for content campaigns. According to some aspects of this disclosure, to ensure campaign management module 134 weighs index values based on where an advertiser is running most of the previous or historical content campaigns and selecting only the most audience/interest categories, campaign management module 134 may select audience/interest categories that are the most present (e.g., a weighted average based on the number of advertisement/content insertion spots, etc.) and target similar audience/interest categories for content campaigns for OTT content/media.

According to some aspects of this disclosure, training the campaign management module 134 to determine correspondences between user profiles and/or audience/interest categories may assist in content campaign generation and related activities. For example, an entity, device, component, user, and/or the like with an intent to reach more user devices, deliver more advertisement impressions, and/or the like may use data/information output by the campaign management module 134 (e.g., an index value that may be used for mapping content providers for a particular communication medium and/or content/media platform to interest categories, content/media item affinity information, indications of content/media consumption propensities, etc.) to manage and/or identify key performance indicators (KPIs) including, but not limited to KPI's identifying a maximize reach of content campaigns, minimizing the cost associated with content campaigns, and/or the like.

Figure 3:
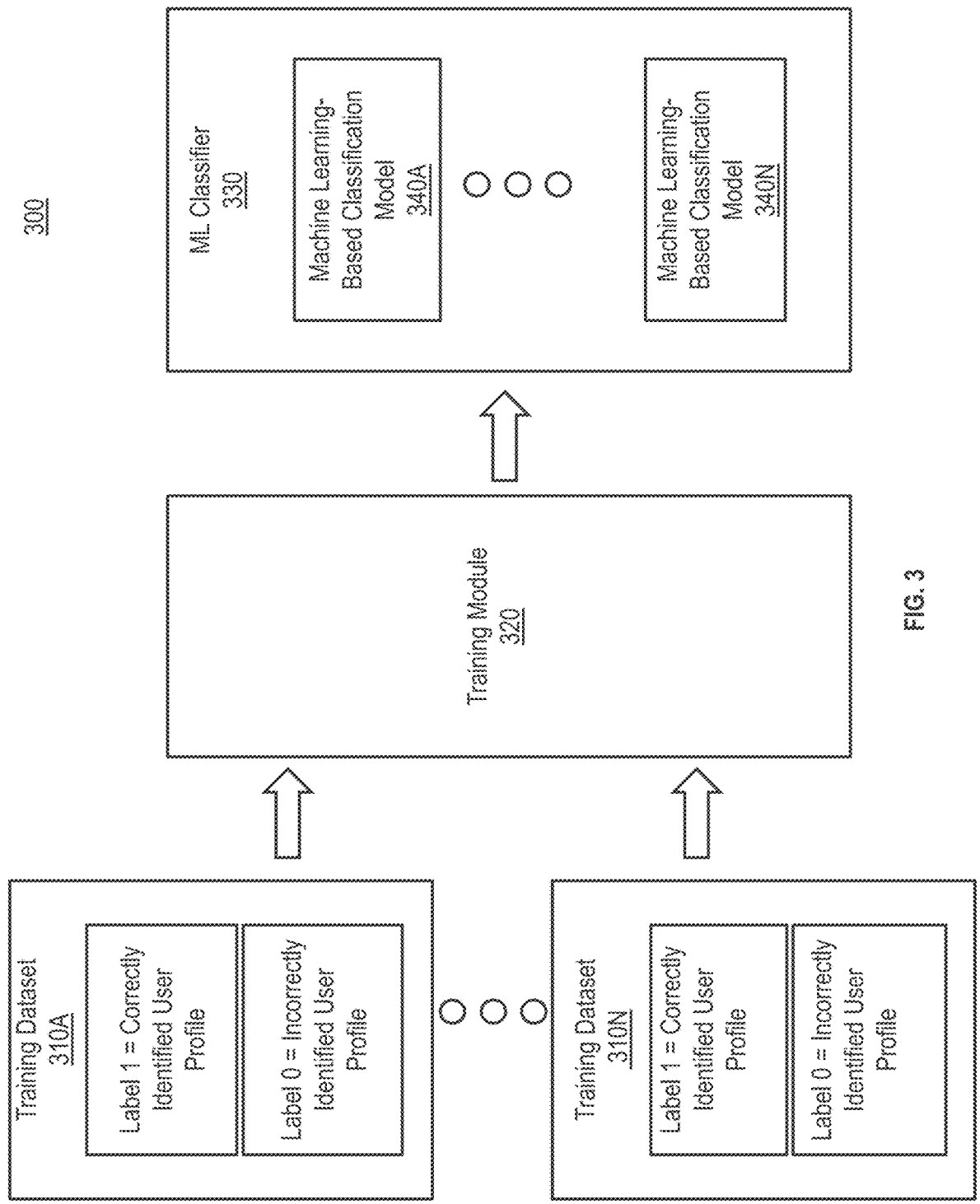
FIG. 3 illustrates a flowchart of an example training method for generating a machine learning classifier to classify data used for identifying user profiles for campaign modification, according to some aspects of this disclosure.

FIG. 3 is an example system 300 for training the campaign management module 134 to determine user profiles and/or correspondences between user profiles, for example, correspondences between user profiles associated with content providers of different and/or various communication mediums, according to some aspects of this disclosure. FIG. 3 is described with reference to FIG. 1.

According to some aspects of this disclosure, system 300 may use machine learning techniques to train at least one machine learning-based classifier 330 (e.g., a software model, neural network classification layer, etc.). The machine learning-based classifier 330 may be trained by the campaign management module 134 based on an analysis of one or more training datasets 310A-310N. According to some aspects of this disclosure, the machine learning-based classifier 330 may be configured to classify features extracted from user device communications, bid stream devices, third-party data sources, content/service provider tracking and/or telemetry data, etc. For example, the machine learning-based classifier 330 may classify features extracted from deterministic data (e.g., data identifying locations, profiles, and/or the like that indicate devices that consume content, cable television, linear television, and/or the like on a permanent basis, etc.), bid stream data (e.g., collected device information, user information, advertisement content information, context footprint information, etc.), and/or the like. According to aspects of this disclosure, all device information, user information, advertisement content information, and/or the like collected, managed, and/or described herein is utilized in accordance with and as permitted by any data privacy laws, user privacy/consent laws, and/or the like.

According to some aspects of this disclosure, the machine learning-based classifier 330 may classify features extracted from deterministic data to identify attributes for and/or associated with a user profile (e.g., location information, demographic information, content interest (e.g., interest in travel, interest in investments, interest in sport, etc.) information, etc.), a user/type of user, and/or a user device. Attributes for and/or associated with a user profile, a user/type of user, and/or a user device may include, but are not limited to demographic information, user device location information, or content affinity information that indicates affinities for a plurality of content types, an indication of accessed/consumed content items, an indication of an amount times and/or duration that a content item and/or content channel is accessed, and/or the like.

According to some aspects of this disclosure, the one or more training datasets 310A-310N may comprise labeled baseline data such as labels that indicate numerical features (e.g., costs associated with historical advertisements and/or content campaigns, budgeting information, etc.), temporal features (e.g., when events occur, etc.), content providers, content mediums (e.g., cable television, OTT service, linear television service, etc.), viewership information (e.g., durations spent by households viewing networks, channels, content provided by content providers, etc.), and/or the like. The labeled baseline data may include any number of feature sets. Feature sets may include, but are not limited to, labeled data that identifies extracted features from user profiles, service accounts, advertising-related communications/activities, user devices, user device types/configurations, and/or the like.

According to some aspects of this disclosure, the labeled baseline data may be stored in one or more databases. Data for identifying user profiles may be randomly assigned to a training dataset or a testing dataset. According to some aspects of this disclosure, the assignment of data to a training dataset or a testing dataset may not be completely random. In this case, one or more criteria may be used during the assignment, such as ensuring that similar demographics, similar locations, similar content interest/affinities, similar bid stream-related information, similar content campaign information, dissimilar demographics, dissimilar locations, dissimilar content interest/affinities, dissimilar bid stream-related information, dissimilar content campaign information, and/or the like may be used in each of the training and testing datasets. In general, any suitable method may be used to assign the data to the training or testing datasets.

According to some aspects of this disclosure, the campaign management module 134 may train the machine learning-based classifier 330 by extracting a feature set from the labeled baseline data according to one or more feature selection techniques. According to some aspects of this disclosure, the campaign management module 134 may further define the feature set obtained from the labeled baseline data by applying one or more feature selection techniques to the labeled baseline data in the one or more training datasets 310A-310N. The campaign management module 134 may extract a feature set from the training datasets 310A-310N in a variety of ways. The campaign management module 134 may perform feature extraction multiple times, each time using a different feature-extraction technique. In some instances, the feature sets generated using the different techniques may each be used to generate different machine learning-based classification models 340. According to some aspects of this disclosure, the feature set with the highest quality metrics may be selected for use in training. The campaign management module 134 may use the feature set(s) to build one or more machine learning-based classification models 340A-340N that are configured to determine and/or predict associations between user profiles associated with and/or indicative of content, content providers, communication mediums used to provide content, and/or the like.

According to some aspects of this disclosure, the training datasets 310A-310N and/or the labeled baseline data may be analyzed to determine any dependencies, associations, and/or correlations between user profiles, user devices, user device types, locations, content items, content item-related metrics (e.g., advertisement impressions, content access/consumption times/periods, etc.), and/or the like in the training datasets 310A-310N and/or the labeled baseline data. The term "feature," as used herein, may refer to any characteristic of an item of data that may be used to determine whether the item of data falls within one or more specific categories. For example, the features described herein may comprise indications of content delivery and/or location information, demographic information, content interest (e.g., interest in travel, interest in investments, interest in sport, etc.) information, user profiles, user devices, user device types, locations, content items, content item-related metrics (e.g., advertisement impressions, content access/consumption times/periods, etc.), and/or any other characteristics.

According to some aspects of this disclosure, a feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any features that appear greater than or equal to 2 times in the labeled baseline data may be considered candidate features. Any features appearing less than 2 times may be excluded from consideration as a feature. According to some aspects of this disclosure, a single feature selection rule may be applied to select features or multiple feature selection rules may be applied to select features. According to some aspects of this disclosure, the feature selection rules may be applied in a cascading fashion, with the feature selection rules being applied in a specific order and applied to the results of the previous rule. For example, the feature selection rule may be applied to the labeled baseline data to generate information (e.g., content delivery and/or location information, demographic information, content interest (e.g., interest in travel, interest in investments, interest in sport, etc.) information, user profiles, user devices, user device types, content items, content item-related metrics, etc.) that may be used for identifying user profiles for campaign modification. A final list of candidate features may be analyzed according to additional features.

According to some aspects of this disclosure, the campaign management module 134 may generate information (e.g., content delivery and/or location information, demographic information, content interest (e.g., interest in travel, interest in investments, interest in sport, etc.) information, user profiles, user devices, user device types, content items, content item-related metrics, etc.) that may be used for identifying user profiles for campaign modification based on a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. According to some aspects of this disclosure, forward feature selection may be used to identify one or more candidate content delivery locations, demographics, content interests, user profiles, user devices, user device types, content items, content item-related metrics, and/or the like. Forward feature selection is an iterative method that begins with no feature in the machine learning model. In each iteration, the feature which best improves the model is added until the addition of a new variable does not improve the performance of the machine learning model. According to some aspects of this disclosure, backward elimination may be used to identify one or more candidate content delivery locations, demographics, content interests, user profiles, user devices, user device types, content items, content item-related metrics, and/or the like. Backward elimination is an iterative method that begins with all features in the machine learning model. In each iteration, the least significant feature is removed until no improvement is observed in the removal of features. According to some aspects of this disclosure, recursive feature elimination may be used to identify one or more candidate content delivery locations, demographics, content interests, user profiles, user devices, user device types, content items, content item-related metrics, and/or the like. Recursive feature elimination is a greedy optimization algorithm that aims to find the best-performing feature subset. Recursive feature elimination repeatedly creates models and keeps aside the best or the worst-performing feature at each iteration. Recursive feature elimination constructs the next model with the features remaining until all the features are exhausted. Recursive feature elimination then ranks the features based on the order of their elimination.

According to some aspects of this disclosure, one or more candidate content delivery locations, demographics, content interests, user profiles, user devices, user device types, content items, content item-related metrics, and/or the like may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to an absolute value of the magnitude of coefficients and ridge regression performs L2 regularization which adds a penalty equivalent to the square of the magnitude of coefficients. According to some aspects of this disclosure, embedded methods may include unidentified/alias user devices being mapped to an embedding space to enable similarity between probabilistic user profiles and deterministic user profiles to be identified. For example, probabilistic user profiles may be inferred to be associated with deterministic user profiles from an identity graph (e.g., an embedding can be built from a graph by content items accessed, requested, and/or consumed via a first communication medium, and content items accessed, requested, and/or consumed via a second communication medium.

According to some aspects of this disclosure, after campaign management module 134 generates a feature set(s), the campaign management module 134 may generate a machine learning-based predictive model 240 based on the feature set(s). A machine learning-based predictive model may refer to a complex mathematical model for data classification that is generated using machine-learning techniques. For example, this machine learning-based classifier may include a map of support vectors that represent boundary features. By way of example, boundary features may be selected from, and/or represent the highest-ranked features in, a feature set.

According to some aspects of this disclosure, the campaign management module 134 may use the feature sets extracted from the training datasets 310A-310N and/or the labeled baseline data to build a machine learning-based classification model 340A-340N to determine and/or predict content delivery locations, demographics, content interests, user profiles, user devices, user device types, content items, content item-related metrics, and/or the like. According to some aspects of this disclosure, the machine learning-based classification models 340A-340N may be combined into a single machine learning-based classification model 340. Similarly, the machine learning-based classifier 330 may represent a single classifier containing a single or a plurality of machine learning-based classification models 340 and/or multiple classifiers containing a single or a plurality of machine learning-based classification models 340. According to some aspects of this disclosure, the machine learning-based classifier 330 may also include each of the training datasets 310A-310N and/or each feature set extracted from the training datasets 310A-310N and/or extracted from the labeled baseline data. Although shown separately, campaign management module 134 may include the machine learning-based classifier 330.

According to some aspects of this disclosure, the extracted features from deterministic user profile data (e.g., a list of content interest/affinity categories, etc.) may be combined in a classification model trained using a machine learning approach such as a siamese neural network (SNN); discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); other neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 330 may comprise a decision rule or a mapping that uses deterministic user profile data and/or the like to determine and/or predict content delivery locations, demographics, content interests, user profiles, user devices, user device types, content items, content item-related metrics, and/or the like.

According to some aspects of this disclosure, the deterministic data and the machine learning-based classifier 330 may be used to determine and/or predict content delivery locations, demographics, content interests, user profiles, user devices, user device types, content items, content item-related metrics, and/or the like for the test samples in the test dataset. For example, the result for each test sample may include a confidence level that corresponds to a likelihood or a probability that the corresponding test sample accurately determines and/or predicts content delivery locations, demographics, content interests, user profiles, user devices, user device types, content items, content item-related metrics, and/or the like. The confidence level may be a value between zero and one that represents a likelihood that the determined/predicted content delivery locations, demographics, content interests, user profiles, user devices, user device types, content items, content item-related metrics, and/or the like are consistent with computed values. Multiple confidence levels may be provided for each test sample and each candidate (approximated) content delivery locations, demographics, content interests, user profiles, user devices, user device types, content items, content item-related metrics, and/or the like. A top-performing candidate content delivery locations, demographics, content interests, user profiles, user devices, user device types, content items, content item-related metrics, and/or the like may be determined by comparing the result obtained for each test sample with computed content delivery locations, demographics, content interests, user profiles, user devices, user device types, content items, content item-related metrics, and/or the like for each test sample. In general, the top-performing candidate content delivery locations, demographics, content interests, user profiles, user devices, user device types, content items, content item-related metrics, and/or the like will have results that closely match the computed content delivery locations, demographics, content interests, user profiles, user devices, user device types, content items, content item-related metrics, and/or the like. The top-performing candidate content delivery locations, demographics, content interests, user profiles, user devices, user device types, content items, content item-related metrics, and/or the like may be used for identifying user profiles for campaign modification operations.

Figure 4:
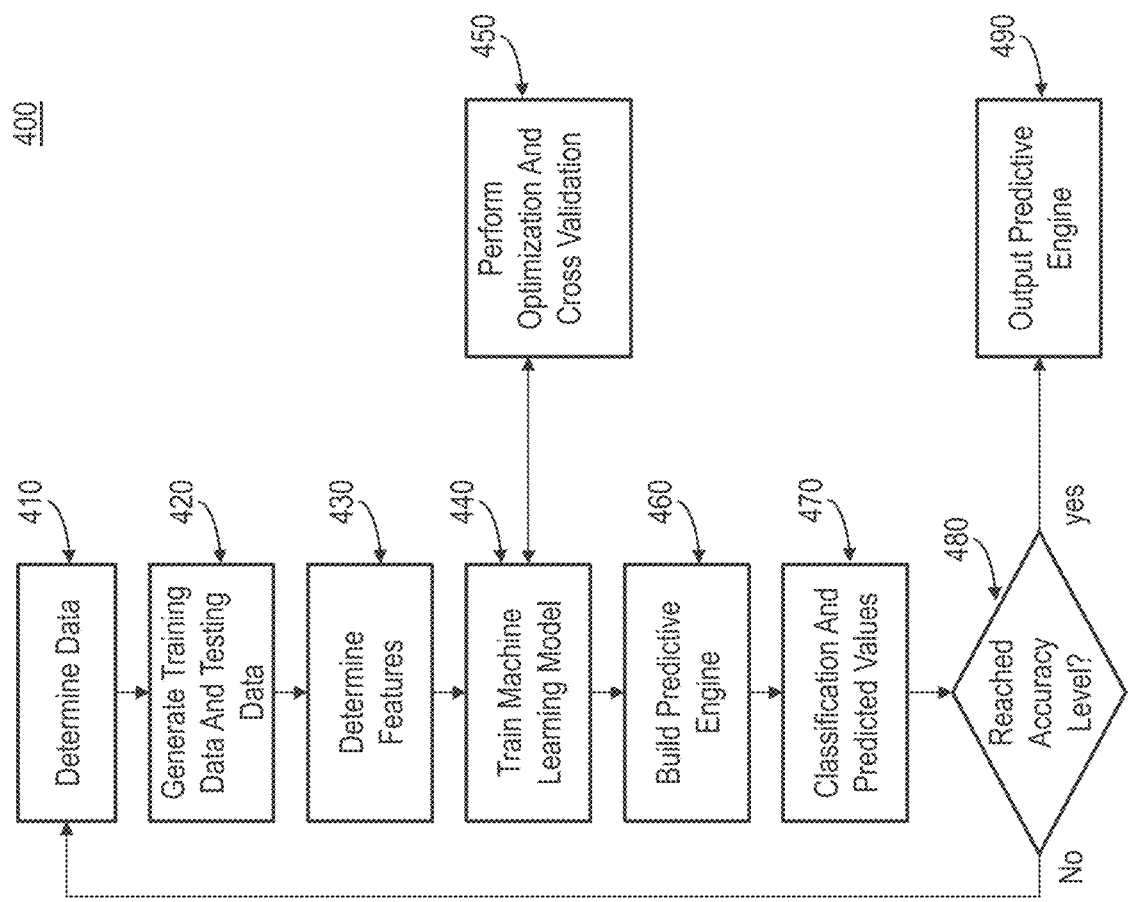
FIG. 4 is a flowchart of an example training method, according to some aspects of this disclosure.

FIG. 4 is a flowchart illustrating an example training method 400. According to some aspects of this disclosure, method 400 configures machine learning classifier 330 for classification through a training process using the campaign management module 134. The campaign management module 134 can implement supervised, unsupervised, and/or semi-supervised (e.g., reinforcement-based) machine learning-based classification models 340. The method 400 shown in FIG. 4 is an example of a supervised learning method; variations of this example of training method are discussed below, however, other training methods can be analogously implemented to train unsupervised and/or semi-supervised machine learning (predictive) models. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to the aspects of those figures.

In 410, the campaign management module 134 determines (e.g., accesses, receives, retrieves, etc.) user profile information. According to some aspects of this disclosure, the user profile information may be deterministic data mapping content provided by content providers via a first communication medium (e.g., cable television, linear television, etc.) to user profiles indicative of the affinities for the content provided by content providers via the first communication medium. According to some aspects of this disclosure, user profile information may be indicative of an amount and/or duration a particular channel, show, content item, and/or the like is watched, played back, accessed, consumed, and/or the like. User profile information may be used to generate one or more datasets.

In 420, campaign management module 134 generates a training dataset and a testing dataset. According to some aspects of this disclosure, the training dataset and the testing dataset may be generated by indicating content delivery locations, demographics, content interests, user profiles, user devices, user device types, content items, content item-related metrics, and/or the like. According to some aspects of this disclosure, the training dataset and the testing dataset may be generated by randomly assigning content delivery locations, demographics, content interests, user profiles, user devices, user device types, content items, content item-related metrics, and/or the like to either the training dataset or the testing dataset. According to some aspects of this disclosure, the assignment of information indicative of content delivery locations, demographics, content interests, user profiles, user devices, user device types, content items, content item-related metrics, and/or the like as training or test samples may not be completely random. According to some aspects of this disclosure, only the labeled baseline data for a specific feature extracted from specific user profile information may be used to generate the training dataset and the testing dataset. According to some aspects of this disclosure, a majority of the labeled baseline data extracted from user profile information and/or related deterministic data may be used to generate the training dataset. For example, 75% of the labeled baseline data for determining content delivery locations, demographics, content interests, user profiles, user devices, user device types, content items, content item-related metrics, and/or the like extracted from the user profile information and/or related data may be used to generate the training dataset and 25% may be used to generate the testing dataset. Any method or technique may be used to create the training and testing datasets.

In 430, campaign management module 134 determines (e.g., extract, select, etc.) one or more features that can be used by, for example, a classifier (e.g., a software model, a classification layer of a neural network, etc.) to label features extracted from a variety of user device information and/or related data. One or more features may comprise indications of content delivery locations, demographics, content interests, user profiles, user devices, user device types, content items, content item-related metrics, and/or the like. According to some aspects of this disclosure, the campaign management module 134 may determine a set of training baseline features from the training dataset. Features of content and/or content item data may be determined by any method.

In 440, campaign management module 134 trains one or more machine learning models, for example, using the one or more features. According to some aspects of this disclosure, the machine learning models may be trained using supervised learning. According to some aspects of this disclosure, other machine learning techniques may be employed, including unsupervised learning and semi-supervised. The machine learning models trained in 340 may be selected based on different criteria (e.g., how close predicted content delivery locations, demographics, content interests, user profiles, user devices, user device types, content items, content item-related metrics, and/or the like is to an actual content delivery locations, demographics, content interests, user profiles, user devices, user device types, content items, content item-related metrics, and/or other data available in the training dataset. For example, machine learning classifiers can suffer from different degrees of bias. According to some aspects of this disclosure, more than one machine learning model can be trained.

In 450, campaign management module 134 optimizes, improves, and/or cross-validates trained machine learning models. For example, data for training datasets and/or testing datasets may be updated and/or revised to include more labeled data indicating different content delivery locations, demographics, content interests, user profiles, user devices, user device types, content items, content item-related metrics, and/or the like.

In 460, campaign management module 134 selects one or more machine learning models to build a predictive model (e.g., a machine learning classifier, a predictive engine, etc.). The predictive model may be evaluated using the testing dataset.

In 470, campaign management module 134 executes the predictive model to analyze the testing dataset and generate classification values and/or predicted values.

In 480, campaign management module 134 evaluates classification values and/or predicted values output by the predictive model to determine whether such values have achieved the desired accuracy level. The performance of the predictive model may be evaluated in several ways based on a number of true positives, false positives, true negatives, and/or false negatives classifications of the plurality of data points indicated by the predictive model. For example, the false positives of the predictive model may refer to the number of times the predictive model incorrectly predicted and/or determined content delivery locations, demographics, content interests, user profiles, user devices, user device types, content items, content item-related metrics, and/or the like. Conversely, the false negatives of the predictive model may refer to the number of times the machine learning model predicted and/or determined content delivery locations, demographics, content interests, user profiles, user devices, user device types, content items, content item-related metrics, and/or the like incorrectly, when in fact, the predicted and/or determined content delivery locations, demographics, content interests, user profiles, user devices, user device types, content items, content item-related metrics, and/or the like matches an actual content delivery locations, demographics, content interests, user profiles, user devices, user device types, content items, content item-related metrics, and/or the like. True negatives and true positives may refer to the number of times the predictive model correctly predicted and/or determined content delivery locations, demographics, content interests, user profiles, user devices, user device types, content items, content item-related metrics, and/or the like. Related to these measurements are the concepts of recall and precision. Generally, recall refers to a ratio of true positives to a sum of true positives and false negatives, which quantifies the sensitivity of the predictive model. Similarly, precision refers to a ratio of true positives as a sum of true and false positives.

In 490, campaign management module 134 outputs the predictive model (and/or an output of the predictive model). For example, campaign management module 134 may output the predictive model when such a desired accuracy level is reached. An output of the predictive model may end the training phase.

According to some aspects of this disclosure, when the desired accuracy level is not reached, in 490, campaign management module 134 may perform a subsequent iteration of the training method 400 starting at 410 with variations such as, for example, considering a larger collection of user profile information and/or related data.

Figure 5:
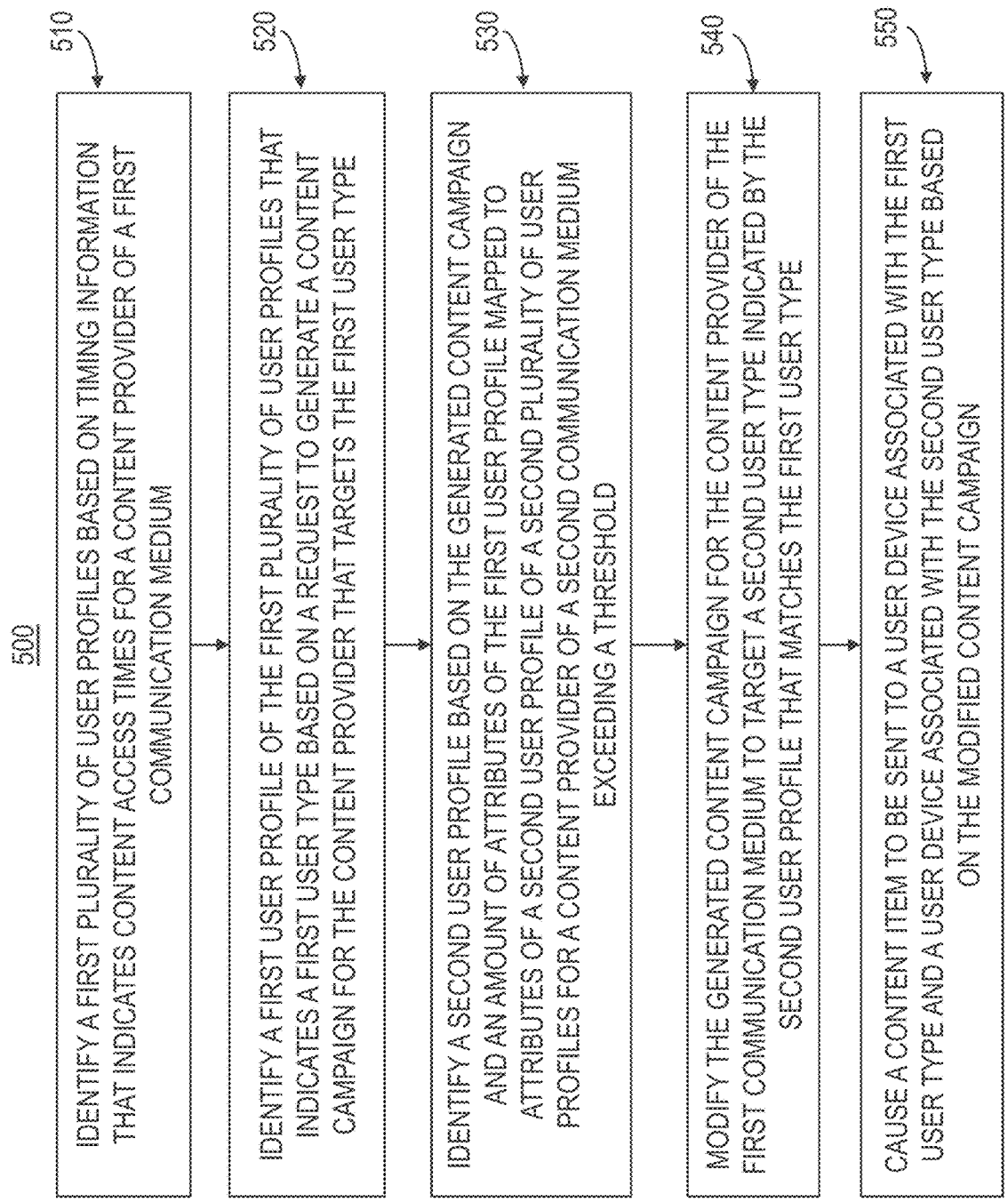
FIG. 5 shows a flowchart of an example method for identifying user profiles for campaign modification, according to some aspects of this disclosure.

FIG. 5 is a flowchart for method 500 for identifying user profiles for campaign modification, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1-4. However, method 500 is not limited to described aspects of FIGS. 1-4.

In 510, computing device 104 identifies a first plurality of user profiles. According to some aspects of this disclosure, computing device 104 identifies the first plurality of user profiles based on timing information that indicates a plurality of access times for a content provided by a content provider of a first communication medium. For example, according to some aspects of this disclosure, an access time for content provided by a content provider may include, but is not limited to, an amount and/or duration a particular channel, show, content item, and/or the like is watched, played back, accessed, consumed, and/or the like.

According to some aspects of this disclosure, computing device 104 may identify the first plurality of user profiles based one information received from and/or output by a predictive model. For example, according to some aspects of this disclosure, computing device 104 may receive an indication of the first plurality of user profiles based on the timing information input to a predictive model trained to forecast user profiles based in part on attributes of content items and access times for the content items.

In 520, computing device 104 identifies a first user profile of the first plurality of user profiles that indicates a first user type. According to some aspects of this disclosure, computing device 104 identifies first user profile of the first plurality of user profiles that indicates the first user type based on a request to generate a content campaign for the content provider of the first communication medium that targets the first user type. For example, a user interface of computing device 104 may, based on one or more interactions with the user interface and/or the like, receive the request to generate the content campaign for the content provider of the first communication medium that targets the first user type In 530, computing device 104 identifies a second user profile of a second plurality of user profiles for a content provider of a second communication medium. According to some aspects of this disclosure, computing device 104 identifies the second user profile of the second plurality of user profiles for the content provider of the second communication medium based on the generated content campaign for the content provider of the first communication medium and an amount of attributes of the first user profile mapped to attributes of the second user profile exceeding a threshold. According to some aspects of this disclosure, computing device 104 may receive an indication of the attributes of the first user profile mapped to the attributes of the second user profile based on information indicative of the first user profile and information describing different user profiles for content providers of the second communication medium input to a predictive model trained to identify correlations between user profiles. According to some aspects of this disclosure, the attributes of the first user profile and the attributes of a second user profile may include demographic information, location information, content affinity information that indicates affinities for a plurality of content types, and/or the like.

In 540, computing device 104 modifies the generated content campaign for the content provider of the first communication medium to target a second user type indicated by the second user profile that matches the first user type.

In 550, computing device 104 causes a content item to be sent to a user device associated with the first user type and a user device associated with the second user type. According to some aspects of this disclosure, computing device 104 causes the content item to be sent to the user device associated with the first user type and the user device associated with the second user type based on the modified content campaign. According to some aspects of this disclosure, computing device 104 causes the content item to be sent to at least one of a location indicated by the request to generate the content campaign or during a time of the plurality of access times that is indicated by the first user profile.

According to some aspects of this disclosure, method 500 may further include computing device 104 causing display of an indication of the generated content campaign, an indication of the modified content campaign, a cost (e.g., identified by a predictive model, etc.) associated with sending the content item, a cost associated with sending additional content items during at least one of the generated content campaign or the modified content campaign, and/or the like.

According to some aspects of this disclosure, method 500 may further include computing device 104 causing display of summary information describing at least one of the content campaign or the modified content campaign. According to some aspects of this disclosure, computing device 104 causes the display of the summary information describing at least one of the content campaign or the modified content campaign based on interaction with a user interface.

Figure 6:
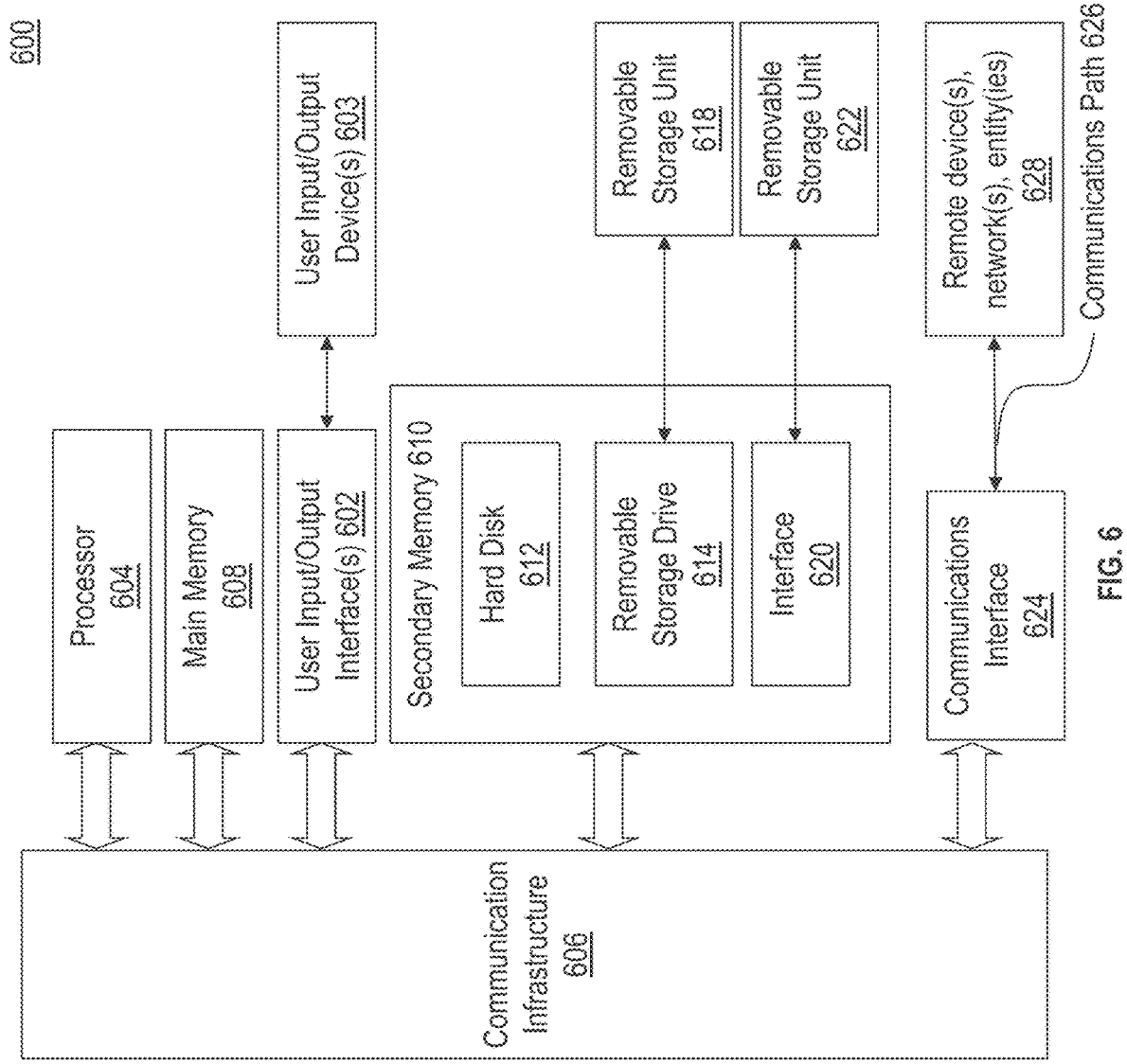
FIG. 6 shows an example computer system useful for implementing various aspects of this disclosure.

FIG. 6 is an example computer system useful for implementing various embodiments. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof. According to some aspects of this disclosure, content device 104, user devices 108 and 110 of FIG. 1 (and/or any other device/component described herein) may be implemented using the computer system 600. According to some aspects of this disclosure, the computer system 600 may be used to implement method 300 and/or any other methods and/or steps described herein.

Computer system 600 may include one or more processors (also called central processing units, or CPUs), such as a processor 604. Processor 604 may be connected to a communication infrastructure or bus 606.

Computer system 600 may also include user input/output device(s) 602, such as monitors, keyboards, pointing devices, etc., which may communicate with communication infrastructure or bus 606 through user input/output device(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, a tape backup device, and/or any other storage device/drive.

Removable storage drive 614 may interact with a removable storage unit 618. The removable storage unit 618 may include a computer-usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to the removable storage unit 618.

Secondary memory 610 may include other means, devices, components, instrumentalities, and/or other approaches for allowing computer programs and/or other instructions and/or data to be accessed by computer system 600. Such means, devices, components, instrumentalities, and/or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
    identifying, based on timing information that indicates a plurality of access times for content provided by a content provider of a wired communication service, a first plurality of user profiles associated with users that are accessible via the wired communication service;
    identifying, responsive to a request to generate a content campaign for the content provider of the wired communication service that targets a first user type and based on the timing information input to a predictive model trained to forecast user profiles based on attributes of content items and access times for the content items, a first user profile of the first plurality of user profiles that indicates the first user type, and wherein pre-training the predictive model comprises:
        extracting attribute data from a user-specific dataset to identify attributes associated with a user profile,
        generating, for the attribute data, at least one of: support vectors of attributes, randomly assigned attributes, or ranking models based on content observations for different entities indicated by entity data,
        generating a training dataset based on the attribute data, and at least one of state vectors of attributes, treatment eligibilities, or the ranking models,
        training, using the training dataset, the predictive model to generate user profiles for users based in part on attributes of different content items and access times for the different content items,
        validating an output of the predictive model using a validating dataset generated based on the attribute data, and
        calibrating, based on the validated output of the predictive model, the predictive model to forecast the user profiles based on the attributes of the content items and the access times for the content items;
    identifying, based on the generated content campaign for the content provider of the wired communication service and an amount of attributes of the first user profile mapped to attributes of a second user profile of a second plurality of user profiles for a content provider of an over-the-top (OTT) communication service exceeding a threshold, the second user profile, wherein the second plurality of user profiles are associated with users that are inaccessible via the wired communication service;
    modifying a characteristic of a content item of the generated content campaign that targeted the first user type via the wired communication service to target a second user type to send the content item to the second user type via the OTT communication service, the second user type being indicated by the second user profile that matches the first user type; and
    causing, based on the modified content campaign, the content item to be sent to a first user device associated with the first user type via the wired communication service and a second user device associated with the second user type via the OTT communication service.

2. The computer-implemented method of claim 1, wherein the causing the content item to be sent to the first user device associated with the first user type and the second user device associated with the second user type further comprises causing the content item to be sent to at least one of a location indicated by the request to generate the content campaign or during a time of the plurality of access times that is indicated by the first user profile.

3. The computer-implemented method of claim 1, further comprising causing display of at least one of an indication of the generated content campaign or an indication of the modified content campaign, and a cost associated with sending at least one of the content item or additional content items during at least one of the generated content campaign or the modified content campaign.

4. The computer-implemented method of claim 1, wherein the attributes of the first user profile and the attributes of the second user profile comprise at least one of demographic information, location information, or content affinity information that indicates affinities for a plurality of content types.

5. The computer-implemented method of claim 1, wherein the identifying the first plurality of user profiles comprises receiving, based on the timing information input to the predictive model, an indication of the first plurality of user profiles.

6. The computer-implemented method of claim 1, further comprising receiving, based on information indicative of the first user profile and information describing different user profiles for content providers of the OTT communication service input to another predictive model trained to identify correlations between user profiles, an indication of the attributes of the first user profile mapped to the attributes of the second user profile.

7. The computer-implemented method of claim 1, further comprising causing, based on interaction with a user interface, display of summary information describing at least one of the content campaign or the modified content campaign.

8. A system, comprising:
    one or more memories;
    at least one processor each coupled to at least one of the memories and configured to perform operations comprising:
        identifying, based on timing information that indicates a plurality of access times for content provided by a content provider of a wired communication service, a first plurality of user profiles associated with users that are accessible via the wired communication service;

identifying, responsive to a request to generate a content campaign for the content provider of the wired communication service that targets a first user type and based on the timing information input to a predictive model trained to forecast user profiles based on attributes of content items and access times for the content items, a first user profile of the first plurality of user profiles that indicates the first user type, and wherein pre-training the predictive model comprises:

extracting attribute data from a user-specific dataset to identify attributes associated with a user profile, generating, for the attribute data, at least one of: support vectors of attributes, randomly assigned attributes, or ranking models based on content observations for different entities indicated by entity data, generating a training dataset based on the attribute data, and at least one of state vectors of attributes, treatment eligibilities, or the ranking models, training, using the training dataset, the predictive model to generate user profiles for users based in part on attributes of different content items and access times for the different content items, validating an output of the predictive model using a validating dataset generated based on the attribute data, and calibrating, based on the validated output of the predictive model, the predictive model to forecast the user profiles based on the attributes of the content items and the access times for the content items;

identifying, based on the generated content campaign for the content provider of the wired communication service and an amount of attributes of the first user profile mapped to attributes of a second user profile of a second plurality of user profiles for a content provider of an over-the-top (OTT) communication service exceeding a threshold, the second user profile, wherein the second plurality of user profiles are associated with users that are inaccessible via the wired communication service;

modifying a characteristic of a content item of the generated content campaign that targeted the first user type via the wired communication service to target a second user type to send the content item to the second user type via the OTT communication service, the second user type being indicated by the second user profile that matches the first user type; and causing, based on the modified content campaign, the content item to be sent to a first user device associated with the first user type via the wired communication service and a second user device associated with the second user type via the OTT communication service.

9. The system of claim 8, wherein the causing the content item to be sent to the first user device associated with the first user type and the second user device associated with the second user type further comprises causing the content item to be sent to at least one of a location indicated by the request to generate the content campaign or during a time of the plurality of access times that is indicated by the first user profile.

10. The system of claim 8, the operations further comprising causing display of at least one of an indication of the generated content campaign or an indication of the modified content campaign, and a cost associated with sending at least one of the content item or additional content items during at least one of the generated content campaign or the modified content campaign.

11. The system of claim 8, wherein the attributes of the first user profile and the attributes of the second user profile comprise at least one of demographic information, location information, or content affinity information that indicates affinities for a plurality of content types.

12. The system of claim 8, wherein the identifying the first plurality of user profiles comprises receiving, based on the timing information input to the predictive model, an indication of the first plurality of user profiles.

13. The system of claim 8, the operations further comprising receiving, based on information indicative of the first user profile and information describing different user profiles for content providers of the OTT communication service input to another predictive model trained to identify correlations between user profiles, an indication of the attributes of the first user profile mapped to the attributes of the second user profile.

14. The system of claim 8, further comprising causing, based on interaction with a user interface, display of summary information describing at least one of the content campaign or the modified content campaign.

15. A non-transitory computer-readable medium having instructions stored thereon that, when executed by at least one computing device, cause the at least one computing device to perform operations comprising:

identifying, based on timing information that indicates a plurality of access times for content provided by a content provider of a wired communication service, a first plurality of user profiles associated with users that are accessible via the wired communication service;

identifying, responsive to a request to generate a content campaign for the content provider of the wired communication service that targets a first user type and based on the timing information input to a predictive model trained to forecast user profiles based on attributes of content items and access times for the content items, a first user profile of the first plurality of user profiles that indicates the first user type, and wherein pre-training the predictive model comprises:

extracting attribute data from a user-specific dataset to identify attributes associated with a user profile, generating, for the attribute data, at least one of: support vectors of attributes, randomly assigned attributes, or ranking models based on content observations for different entities indicated by entity data, generating a training dataset based on the attribute data, and at least one of state vectors of attributes, treatment eligibilities, or the ranking models, training, using the training dataset, the predictive model to generate user profiles for users based in part on attributes of different content items and access times for the different content items, validating an output of the predictive model using a validating dataset generated based on the attribute data, and calibrating, based on the validated output of the predictive model, the predictive model to forecast the user profiles based on the attributes of the content items and the access times for the content items;

identifying, based on the generated content campaign for the content provider of the wired communication service and an amount of attributes of the first user profile mapped to attributes of a second user profile of a second plurality of user profiles for a content provider of an over-the-top (OTT) communication service exceeding a threshold, the second user profile, wherein the second plurality of user profiles are associated with users that are inaccessible via the wired communication service;

modifying a characteristic of a content item of the generated content campaign that targeted the first user type via the wired communication service to target a second user type to send the content item to the second user type via the OTT communication service, the second user type being indicated by the second user profile that matches the first user type; and causing, based on the modified content campaign, the content item to be sent to a first user device associated with the first user type via the wired communication service and a second user device associated with the second user type via the OTT communication service.

16. The non-transitory computer-readable medium of claim 15, wherein the causing the content item to be sent to the first user device associated with the first user type and the second user device associated with the second user type further comprises causing the content item to be sent to at least one of a location indicated by the request to generate the content campaign or during a time of the plurality of access times that is indicated by the first user profile.

17. The non-transitory computer-readable medium of claim 15, the operations further comprising causing display of at least one of an indication of the generated content campaign or an indication of the modified content campaign, and a cost associated with sending at least one of the content item or additional content items during at least one of the generated content campaign or the modified content campaign.

18. The non-transitory computer-readable medium of claim 15, wherein the attributes of the first user profile and the attributes of the second user profile comprise at least one of demographic information, location information, or content affinity information that indicates affinities for a plurality of content types.

19. The non-transitory computer-readable medium of claim 15, wherein a plurality of access durations for the content correspond to respective amounts of time that user devices accessed the content via a channel provided by the wired communication service, and the access durations for the different content items correspond to respective amounts of time that different user devices accessed the content items via the channel or a different channel provided by the wired communication service.

20. The non-transitory computer-readable medium of claim 15, the operations further comprising receiving, based on information indicative of the first user profile and information describing different user profiles for content providers of the OTT communication service input to another predictive model trained to identify correlations between user profiles, an indication of the attributes of the first user profile mapped to the attributes of the second user profile.

* * * * *